(12) United States Patent
Schluntz

(10) Patent No.: US 7,036,834 B2
(45) Date of Patent: May 2, 2006

(54) AIR RIDE SUSPENSION

(76) Inventor: Roger D. Schluntz, deceased, late of Lowell, IN (US); by Gary R. Schluntz, legal representative, 116 E. High St, Morris, IL (US) 60450; by Janice B. Schultz, legal representative, 28126 S. 120th Ave., Peotone, IL (US) 60468

( * ) Notice: Subject to any disclaimer, the term of this patent is extended or adjusted under 35 U.S.C. 154(b) by 172 days.

(21) Appl. No.: 10/761,945

(22) Filed: Jan. 21, 2004

(65) Prior Publication Data
US 2004/0155425 A1 Aug. 12, 2004

Related U.S. Application Data

(60) Provisional application No. 60/445,668, filed on Feb. 6, 2003.

(51) Int. Cl.
*B60G 3/12* (2006.01)
(52) U.S. Cl. .................... 280/124.128; 280/124.153
(58) Field of Classification Search ......... 280/124.128, 280/124.13, 124.153, 124.154, 793, 124.1
See application file for complete search history.

(56) References Cited

U.S. PATENT DOCUMENTS

| | | | |
|---|---|---|---|
| 4,415,179 A | 11/1983 | Marinelli | |
| 4,714,269 A | 12/1987 | Raidel | |
| 5,346,247 A | 9/1994 | Snyder | |
| 5,470,096 A | 11/1995 | Baxter | |
| 5,634,655 A | 6/1997 | Chalin | |
| 5,678,845 A | 10/1997 | Stuart | |
| 5,865,452 A | 2/1999 | Chalin | |
| 6,073,947 A * | 6/2000 | Gottschalk et al. | ... 280/124.128 |
| 6,135,470 A * | 10/2000 | Dudding | .............. 280/124.128 |
| 6,158,750 A * | 12/2000 | Gideon et al. | ............. 280/86.5 |
| 6,182,984 B1 | 2/2001 | Chalin | |
| 6,209,895 B1 | 4/2001 | Mueller | |
| 6,328,324 B1 | 12/2001 | Fenton | |
| 6,398,239 B1 | 6/2002 | Chalin | |
| 6,454,283 B1 | 9/2002 | Fenton | |
| 6,527,286 B1 * | 3/2003 | Keeler et al. | .......... 280/124.135 |
| 6,851,689 B1 * | 2/2005 | Dudding et al. | ....... 280/124.128 |
| 6,857,647 B1 * | 2/2005 | Johnsman et al. | .... 280/124.163 |
| 2001/0052685 A1 * | 12/2001 | Svartz et al. | .......... 280/124.116 |
| 2005/0082814 A1 * | 4/2005 | Ramsey | ...................... 280/793 |

* cited by examiner

*Primary Examiner*—Paul N. Dickson
*Assistant Examiner*—Toan C. To
(74) *Attorney, Agent, or Firm*—Frank D Lachenmaier

(57) ABSTRACT

This invention generally relates to devices for an air ride suspension system for one or two axle light duty trailers. More specifically, this invention relates a novel air ride suspension system for light duty trailers that eliminates the need for leaf springs, dissipates normal road vibrations, dramatically reduces the stress on trailers and their fixtures and can be sold and installed in kit form for either above or below axle mounting.

4 Claims, 3 Drawing Sheets

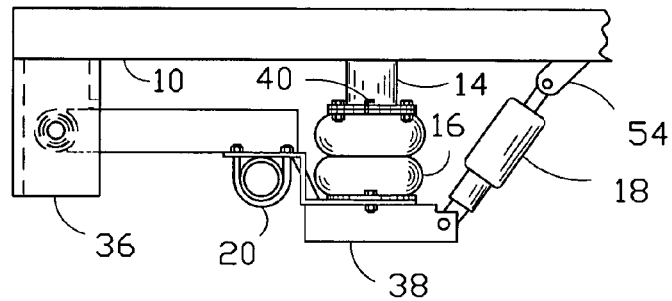
FIG. 7
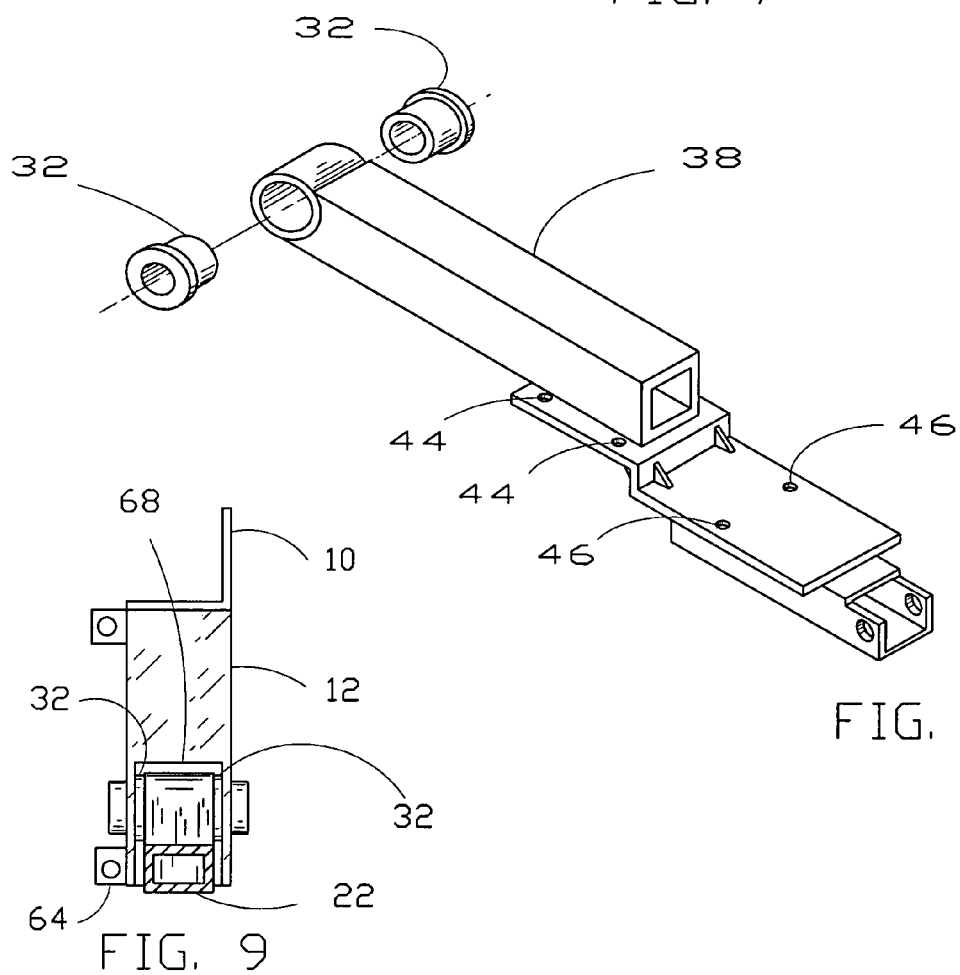
FIG. 8
FIG. 9

AIR RIDE SUSPENSION

CROSS-REFERENCE TO RELATED APPLICATION

This application claims the benefit of Provisional Patent Application Ser. No. 60/445,668 filed Feb. 6, 2003.

BACKGROUND

1. Field of Invention

This invention generally relates to devices for an air ride suspension system for a light duty trailer. More specifically, this invention relates a novel air ride suspension system for light duty trailers that eliminates the need for leaf springs, dissipates normal road vibrations, dramatically reduces the stress on trailers and their fixtures and can be sold and installed in kit form for either one or two axle trailers with optional mounting above or below the axle.

2. Prior Art

A variety of air ride assist suspension systems exist but most of them have the air springs attached to leaf springs. None of the prior art devices disclose the unique features of the air suspension system such as the ability to install in kit form without welding.

U.S. Pat. No. 5,865,452 (1999), U.S. Pat. No. 6,182,984 (2001) and U.S. Pat. No. 6,398,239 (2002) all to Chalin are focused on steerable suspension systems. U.S. Pat. No. 5,346,247—Snyder (1994), U.S. Pat. No. 5,470,096—Baxter (1995), U.S. Pat. No. 5,634,655—Chalin (1997), U.S. Pat. No. 5,678,845—Stuart (1997), U.S. Pat. No. 6,328,324—Fenton (2001) and U.S. Pat. No. 6,454,283—Fenton (2002) all disclose various combinations of air springs mounted onto leaf springs. U.S. Pat. No. 6,209,895—Mueller (2001) shows an axle suspension system for a single axle trailer with a forward pivotal mounting arm with a shock absorber mounted in front of the axle and an air spring mounted behind the axle. This patent appears to embody many of the same features as the earlier filed U.S. Pat. No. 4,415,179—Marinelli (1983) with the exception of its Y-shaped stabilizer bar. U.S. Pat. No. 4,714,269—Raidel (1987) again shows an axle mounted suspension system for a single axle trailer but it includes a shock absorber and an air spring before and after the axle and mounted as far out board as possible.

SUMMARY

In accordance with the present invention, an air ride suspension system is comprised of two angle iron frame rails positioned parallel to each other and open to the inside and top such that the box of trailer can be slipped between the outside walls and sit on the lower walls and are bolted to the trailer box. The frames have control arm brackets, axle stop brackets, air spring brackets, and shock absorber brackets welded to the under side directly opposite of the like bracket on the opposing frame. One set of these brackets on each frame is required for a single axle trailer. Two sets of these brackets are required for a dual axle trailer. Control arms are inserted with resilient bushings and pivotally attached to the control arm brackets at the resilient bushings. Polyurethane stops are screwed into the axle stop brackets. Air springs are mounted onto the control arm behind the axle and attached to the underside of the air spring bracket. Behind the air spring, a shock absorber is mounted to the end of the control arm and connected to the underside of the shock absorber bracket. Axles are mounted either above or below the control arms utilizing standard U bolt mechanisms. This system can be sold in pre-assembled kit form and the kit installed by simply removing the old suspension system from existing trailer, sitting the trailer into the angle iron frame and bolting in place, connecting cross braces between the bottom mounting lug of one control arm bracket and the top mounting lug on the opposing control arm bracket, mounting the old axles onto the control arms, reinstalling wheels and adjusting air spring pressure.

DRAWINGS

In order that the invention may be more fully understood it will now be described by way of example, with reference to the accompanying drawings in which:

FIG. 7 is a partial side elevational view of an over axle mounting embodiment.

FIG. 8 is a perspective view of a control arm welded assembly for over axle mounting.

FIG. 9 is a forward facing partial section view showing mounting notch in control arm bracket.

REFERENCE NUMERALS

| | |
|---|---|
| 10 angle iron frame rail | 12 control arm bracket under axle |
| 14 air spring mounting bracket | 16 air spring |
| 18 shock absorber | 20 axle mount ubolt |
| 22 control arm under axle | 24 cross brace |
| 26 pivot bolt | 28 cross drill for lube fitting |
| 30 Pivot bolt lock nut | 32 resilient bushing |
| 34 standard trailer axle | 36 control arm bracket over axle |
| 38 control arm over axle | 40 air spring fill valve stem |
| 42 air spring mounting bracket over axle | 44 u-bolt axle mounting holes |
| | 48 axle centering hole |
| 46 air spring mounting holes | 52 axle stop |
| 50 axle stop bracket | 56 mounting holes |
| 54 shock absorber bracket | 60 control arm bracket trailing side |
| 58 frame rail front end | 64 tabs |
| 62 1½ in. diameter opening | 66 leading edge of box frame |
| 68 control notch | |

DESCRIPTION

In order that the invention may be more fully understood, it will now be described by way of example with reference to the accompanying drawings in which FIGS. 1 through 6 and 9 illustrate an air ride suspension system for light duty travel trailers that have axle or axles 34 mounted to the top of control arm assemblies 22.

Figure 1:
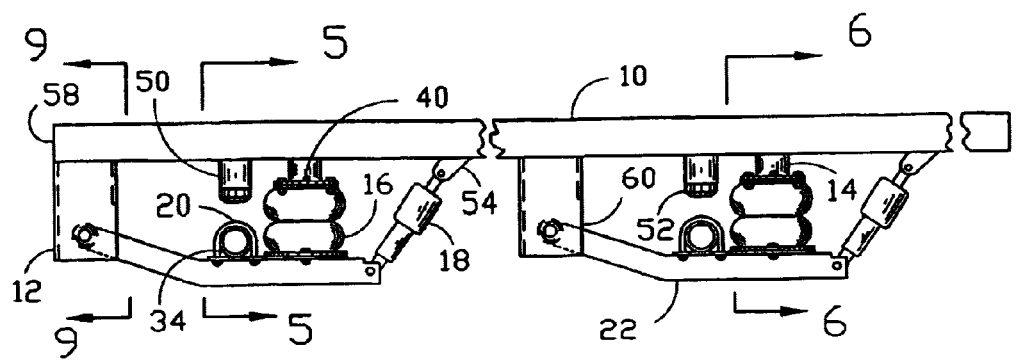
FIG. 1 is a side elevational view of an air ride suspension system.
Figures 5, 6:
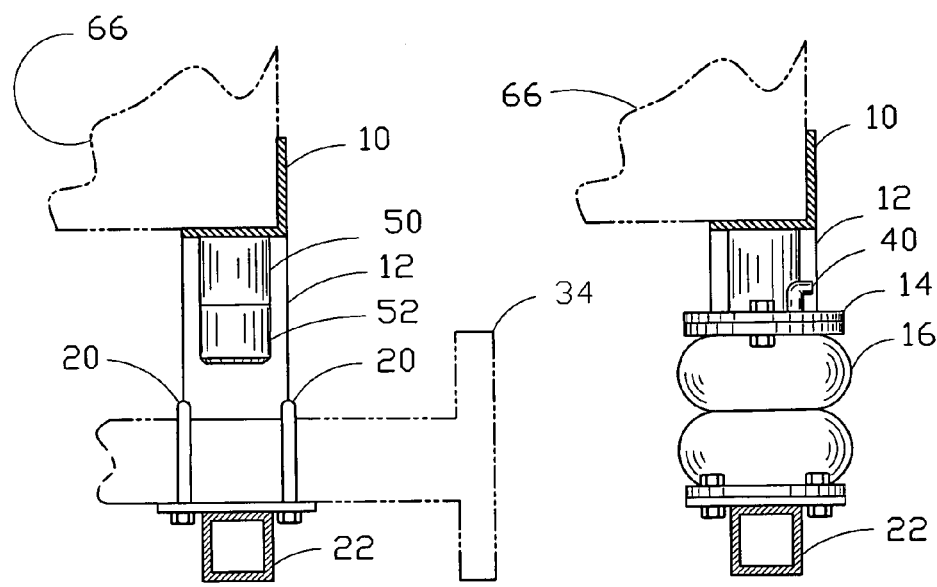
FIG. 5 is a cross-sectional view showing axle mounting.
FIG. 6 is a cross-sectional view showing air spring mounting.

Turning to FIG. 1, FIG. 5 and FIG. 6, a right side view and two cross section views respectively of the air ride suspension system shows frame rail 10 which is a frame of 3 in.×3 in.×¼ in. angle iron, open to the top for receiving a box of said trailer (not part of this invention) of a length to fit the underside of a particular trailer with leading edge 66. Welded to the under sides of frame rail 10 are control arm brackets 12 made from 3 in.×5 in.×¼ in. wall steel tubing, axle stop brackets 50 made from 2 in. diameter sold steel rod, air spring mounting brackets 14 made from 2 in diameter×¼ in. wall tubing with a 5 in. diameter×¼ in. thick plate welded to the bottom of the tube concentric with the tube diameter.

Figure 3:
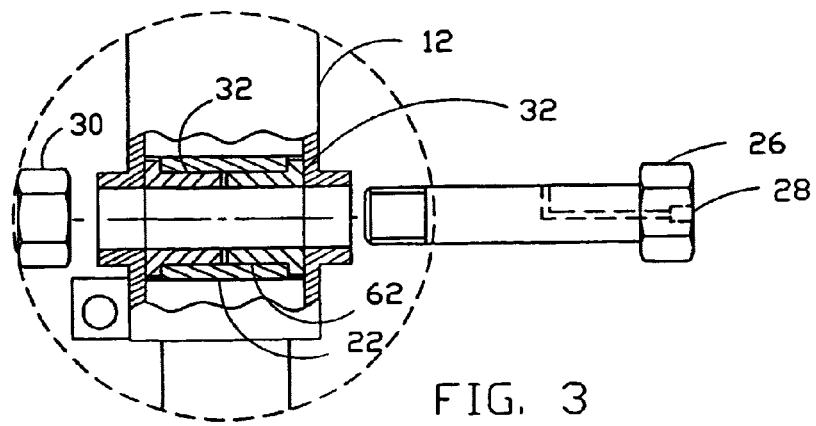
FIG. 3 is an enlarged view of the partial section in FIG. 2 with an exploded section showing the mounting bolt and nut.
Figure 4:
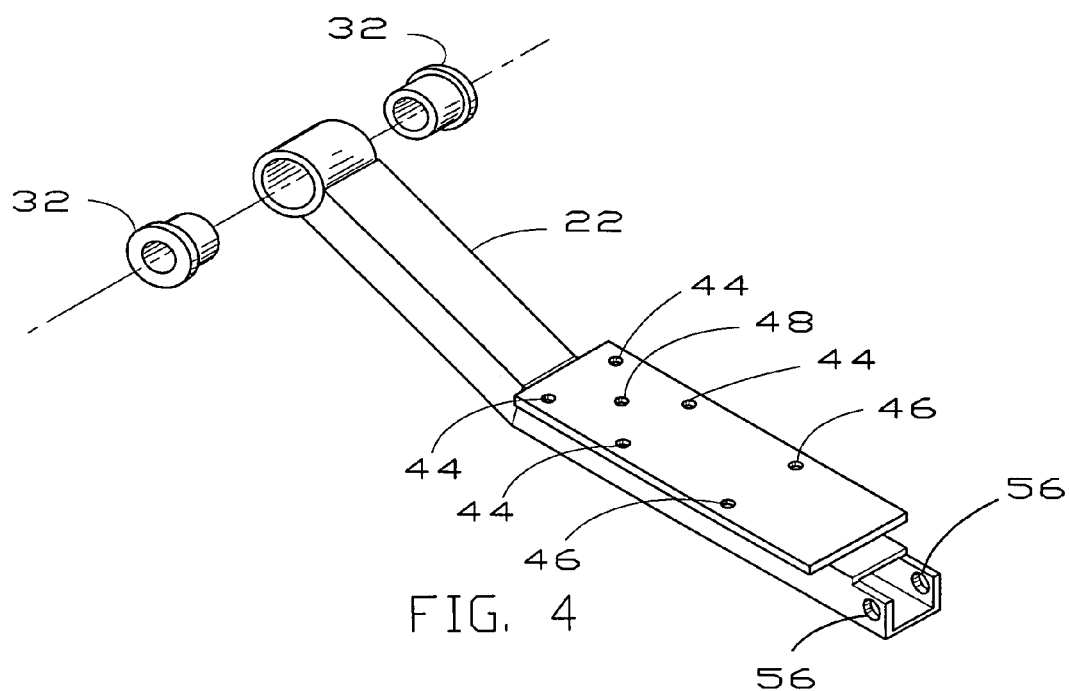
FIG. 4 is a perspective view of a control arm welded assembly for under axle mounting.

Trailing side 60 of control arm bracket 10 has notch 68 which allows insertion of control arm 22, shown in FIGS. 4 and 9, with two resilient bushings 32 inserted into the 1½ in. diameter opening 62 in the end of control arm 22. A one inch diameter pivot bolt 26, shown in FIG. 3, is then inserted through the clearance hole in the 5 in. wide side wall of control arm bracket 12, through the two bushings 32 and out the other clearance hole in the back side of control arm bracket 12. Lock nut 30 is then tightened onto bolt 26 which has crossed drilled and counter bored hole 28 for a lube fitting (not shown). On the opposite end of control arm 22 is a clearance notch and mounting holes 56 for the pivotal attachment of one end of standard shock absorber 18 which is connected at the opposite end pivotally to shock absorber bracket 54.

Axle stop bracket 50 is made from a 2 in. diameter by 2 in. long section of steel rod with a tapped hole centered in one end concentric with the O.D. for screwing in the threaded projection (not shown) from the top of polyurethane axle stop 52.

Figure 2:
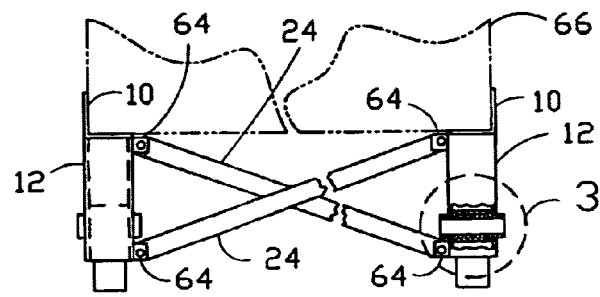
FIG. 2 is a front end view of the air ride suspension system in FIG. 1.

FIG. 2 is a front end view looking back toward the trailer showing two frames 10 with control arm brackets 12 welded at parallel positions on the opposing frames 10, aligning the 3 in. side of bracket 12 with the 3 in. width of angle iron frame 10 for a single axle trailer or two sets of opposing control arm brackets for a dual axle trailer spaced as far apart as the axles. Tabs 64 are welded to the top and bottom of the inside, forward edge of control arm brackets 12 for bolting in place cross braces 24 to stabilize the control arm brackets 12. Increased bearing length for the control arm pivot is obtained by welding 1½ in. O.D.×1 in. I.D.×½ in. thick washers to the outsides of control arm brackets 12 concentric with the 1 in. diameter pivot mounting holes in the 5 in. width of control arm bracket 12.

FIG. 3 is an enlarged exploded view of a partial section of control arm bracket 12 which shows in cross section the 2 in. diameter section of the end of control arm 22 containing two inserted bushings 32 slipped between the 2½ in. internal width of the control arm bracket. In the exploded segment of FIG. 3, one inch diameter bolt 26 is shown in line with the clearance holes in the 5 in. sides of the control arm bracket and the I.D.s of bushings 32 and lock nut 30. Also in FIG. 3 a small diameter hole, cross drill and counter bore 28 is noted through bolt 26 for a lube fitting (not shown).

FIG. 4 is a perspective view showing control arm 22. Control arm 22 is made from 2 in.×2 in.×¼ in. steel tubing and is notched, bent and welded at a sufficient angle down from the center of bushings 32 to allow the lower section to be displaced approximately level with the ground in its unflexed state. A 2 in. O.D.×1½ in. I.D.×2 in. long steel tube is welded at a right angle to the end of the 2 in. square tube. Two resilient bushings 32 made from series 2000 polyurethane by Daystar, Inc. in Phoenix Ariz., are inserted into its opposing ends. A 11 in.×4½ in.×¼ in steel plate is welded onto the top of the 2×2 steel tube on the lower level section. This plate has 4 holes 44 for the u-bolts 20 for mounting axle 34 to control arm 22. This plate also has two holes 46 for mounting the bottom of air spring 16 to control arm 22. Hole 48 is used for the centering dowel that squares the axle to the frame when the u-bolts are tightened.

FIG. 5 is a partial section view of FIG. 1 that shows control arm bracket 12 welded to angle iron frame 10 and two u-bolts 20 holding axle 34 on top of control arm 22.

FIG. 6 is a partial section view of FIG. 1 that shows air spring 16 being mounted between control arm 22 and air spring bracket 14 which is made from 2 in diameter×¼ in. wall tubing with a 5 in. diameter×¼ in. thick plate welded to the bottom of the tube concentric with the tube diameter which is welded to the under side of angle iron frame 10.

Turning to FIG. 7, a partial side view is shown of a second embodiment for trailers which due to the shape and curvature of their axles cannot utilize the design shown above. For these trailers an under control arm axle mount is desired. Again two frames 10 are utilized to assemble the suspension system in kit form for ease of installation. In order to maintain the correct ride height, approximately 5½ inches, the pivot point for control arm 38 is slightly higher in control arm bracket 36 than in control bracket 12. The first section of 2×2×¼ steel tube of control arm 38, as shown in FIG. 8, is welded to the top of the axle and air spring mounting plate. This plate is not a flat plate as in the earlier embodiment but has a right angle "Z" form to a lower level at sufficient depth to allow control arm 38 to set approximately level with the ground in its unflexed state. Below the bottom section of this plate is welded the lower section of 2×2×¼ steel tube with a similar notch and mounting for standard shock absorber 18. The horizontal spacing of the mounting holes 44, 48, & 46 are the same as in the earlier embodiment. As shown in FIG. 7, two u-bolts 20 are mounted from the bottom side of each control arm 38 on both sides of the 2 in. tube section, thus providing clamping of axle 34 to the under side of control arm 38 and clearance for axles that are curved in shape. Finally, FIG. 9 is a forward facing partial section view showing control mounting notch 68 in control arm bracket trailing side 60 with control arm 22 pivotally mounted in its center on bushings 32.

The preceding descriptions are for illustrative purposes and are not intended to limit the scope of this invention. The scope of the invention should be determined by the appended claims rather than by the specific examples given. Manufacture and assembly techniques well known to those skilled in the arts of mass production are contemplated on this invention for high volume applications. The embodiments shown are those embraced for start-up volumes but do not limit or constrain this no leaf spring, non-welding installation kit form of air ride suspension system.

The invention claimed is:

1. An over axle suspension system for a single axle light duty trailer, said suspension system comprising:

two parallel angle iron frame rails, open to the top and inside and spaced apart wide enough to receive a box frame of said trailer and bolted to each side of said box frame;

two control arm brackets suspended from the under side of said frame rails parallel to each other with control mounting notches facing rearward;

two axle stop brackets suspended from the underside of said frame rails at a distance far enough behind said control arm brackets as to be directly over the proposed axle location, said axle stop brackets having axle stops attached to their bottom surfaces;

two air spring mounting brackets suspended from the underside of said frame rails at a distance far enough behind said axle stop brackets as to allow standard air springs to clear the axle of said trailer;

two shock absorber brackets suspended from the under side of said frame rails at a distance far enough behind said air spring mounting brackets to allow shock absorbers to clear said air springs;

two control arms having front ends and rear ends with an axle alignment feature which can receive an axle centering dowel, with said front ends pivotally mounted in said control arm brackets with polyurethane bushings and said rear ends pivotally mounted to bottom ends of said two shock absorbers which have top ends pivotally mounted to said shock absorber brackets, allowing said control arms to be essentially parallel with the bottom of said trailer when at rest;

two air springs mounted between said air spring mounting brackets and a top surface of a top plate of said control arms at air spring mounting holes;

two sets of two u-bolts overarching said axle of trailer and connecting said axle to tops of control arms; and two cross-braces connecting and stabilizing said frame rails and attached at tabs located on the leading inside top and bottom edges of said control arm brackets.

2. An over axle suspension system for suspension system as defined in claim 1 for a dual axle light duty trailer wherein a second set of brackets, control arms, air springs, axle stops and shock absorbers is suspended from the underside of said frame rails, spaced behind the first set such that said axle stops are centered above the second axle.

3. An under axle suspension system for a single axle light duty trailer, said suspension system comprising:

two parallel angle iron frame rails, open to the top and inside and spaced apart wide enough to receive a box frame of said trailer and bolted to each side of said box frame;

two control arm brackets suspended from the under side of said frame rails parallel to each other with control mounting notches facing rearward;

two axle stop brackets suspended from the underside of said frame rails at a distance far enough behind said control arm brackets as to be directly over the proposed axle location, said axle stop brackets having axle stops attached to their bottom surfaces;

two air spring mounting brackets suspended from the underside of said frame rails at a distance far enough behind said axle stop brackets as to allow standard air springs to clear the axle of said trailer;

two shock absorber brackets suspended from the under side of said frame rails at a distance far enough behind said air spring mounting brackets to allow shock absorbers to clear said air springs;

two control arms having front ends and rear ends with an axle alignment feature which can receive an axle centering dowel, with said front ends pivotally mounted in said control arm brackets with polyurethane bushings and said rear ends pivotally mounted to bottom ends of said two shock absorbers which have the top ends pivotally mounted to said shock absorber brackets, allowing said control arms to be essentially parallel with the bottom of said trailer when at rest;

two air springs mounted between said air spring mounting brackets and a top surface of a top plate of said control arms at air spring mounting holes;

two sets of two u-bolts under-arching said axle of trailer and connecting said axle to bottoms of control arms; and two cross-braces connecting and stabilizing rail assemblies attaching at the tabs located on the leading inside top and bottom edges of said control arm brackets.

4. An under axle suspension system as defined in claim 3 for a dual axle light duty trailer wherein a second set of control arms, air springs, axle stops and shock absorbers is suspended from the underside of said frame rails, spaced behind the first set such that said axle stops are centered above the second axle.

* * * * *